Patented Oct. 14, 1952

2,613,877

UNITED STATES PATENT OFFICE 2,613,877

SUPERSONIC TREATMENT OF BATTERY MATERIALS

George Hunrath, Asbury Park, N. J., assignor to the United States of America as represented by the Secretary of the Army No Drawing. Application October 9, 1950, Serial No. 189,305

3 Claims. (Cl. 241—1)

(Granted under the act of March 3, 1883, as amended April 30, 1928; 370 O. G. 757)

The invention described herein may be manufactured and used by or for the Government for governmental purposes, without the payment of any royalty thereon.

This invention relates to improvements in the depolarizing mixture which surrounds the carbon electrodes of Le Clanche type primary dry cells. These depolarizing mixtures consist mainly of finely divided manganese dioxide having admixed therewith carbon black, graphite, or other inert, electrically conductive materials to improve the conductivity of the depolarizing body.

Since manganese dioxide is one of the most important single constituents of Le Clanche type dry batteries, and since Le Clanche type batteries have been manufactured in huge quantities both for civilian and military use over the last few decades, the quality and availability of manganese dioxide are of critical importance. However, in spite of extensive investigation into the natural ores and synthetic products the compositional, structural and genetic relationships of the different types of manganese dioxide have not yet been satisfactorily established or understood; therefore there still exists great uncertainty as to the relationship between the characteristics of manganese dioxide and battery performance, particularly as far as capacity and shelf life is concerned.

It is an object of this invention to improve the battery performance of Le Clanche type cells by generally improving the depolarizing mixture surrounding the carbon electrode of the cells. This and other objects of the present invention are attained by applying supersonic vibrations either to the manganese dioxide alone or to the other substances of the depolarizing mixture as well, for the purpose of reducing the particle size of these various substances to the finest degree possible.

The present invention lies, therefore, in the discovery that the battery performance of Le Clanche type batteries may be markedly increased if either the finely ground manganese dioxide alone, or the other materials of the depolarizing mixture surrounding the carbon electrode as well, are subjected to the action of supersonic vibrations for a period of time sufficient to reduce the particle size to the smallest possible order.

In practicing my invention I expose the manganese dioxide to the action of supersonic vibrations produced in any well known and suitable manner. The supersonic vibrations may, for instance, be of the type generated by a quartz piezo-electric crystal which is placed between the electrodes of a high frequency alternating current. Vibrations of this type are known as supersonic because they have a frequency above the audible range, that is, above about 20,000 per second. It is to be understood that vibrations of any suitable frequency within the supersonic range may be used for the purpose of this invention although I find that most efficient results are obtained at a frequency above about 50,000 per second.

The supersonic vibrations may also be generated by magnetostriction or in any other suitable way. Generally, it is sufficient to apply the action of supersonic vibrations for about 30 minutes in order to get the desired results.

After the manganese oxide has been subjected to the supersonic treatment according to the invention, it is mixed with the proper proportions of the other ingredients conventionally used in preparing the depolarizing body surrounding the carbon electrode, as, for instance, carbon black, finely ground graphite or other electrically conductive materials chemically inert to the action of the cell.

In some cases it is found advantageous also to subject these additional materials (carbon black, graphite, etc.) before mixing them with the already treated manganese oxide, to the action of supersonic vibration for the same purpose of reducing their particle size to the finest degree possible.

A still further improvement of the depolarizing mix consists in first subjecting the manganese dioxide to the action of supersonic vibration, admixing therewith the above mentioned inert ingredients (carbon black, graphite, etc.) which may or may not have been treated with supersonic vibrations, and then subjecting this mixture again to supersonic vibrations for the purpose of obtaining a particularly fine dispersion or suspension of the various particles having greater irreversibility or stability as the untreated mixture.

The time required for the supersonic treatment will, of course, vary, depending on the particle size and density of the material to be treated, the power of the supersonic waves applied and the desired degree of particle size reduction.

Having thus described my invention and the manner of its use, what I claim is:

1. The method of producing an improved mixture of manganese dioxide and electrically conductive inert materials to be used as the depolarizing body surrounding the carbon electrode of Le Clanche type primary dry cells comprising subjecting said manganese dioxide in finely divided form to supersonic vibrations, mixing said treated manganese dioxide with electrically conductive vibrations for the purpose of improving the irreversibility and stability of said mixture.

2. The method of producing a depolarizing mixture according to claim 1 in which said inert materials are subjected to supersonic vibrations before mixing them with said manganese dioxide.

3. The method of producing an improved mixture of manganese dioxide and carbon black to be used as the depolarizing body surrounding the carbon electrode of Le Clanche type primary dry cells comprising subjecting said manganese dioxide in finely divided powder form and said carbon black to supersonic vibrations for the purpose of still further reducing the particle size of said manganese dioxide and said carbon black, mixing said treated manganese dioxide and said treated carbon black and further subjecting said mixture to supersonic vibration for the purpose of improving the irreversibility and stability of said mixture.

GEORGE HUNRATH.

REFERENCES CITED

The following references are of record in the file of this patent:

UNITED STATES PATENTS

| Number | Name | Date |
| --- | --- | --- |
| 1,162,449 | Burgess | Nov. 30, 1915 |
| 1,538,895 | Hirsch et al. | May 26, 1925 |
| 2,163,649 | Weaver | June 27, 1939 |
| 2,225,797 | Plauson | Dec. 24, 1940 |

FOREIGN PATENTS

| Number | Country | Date |
| --- | --- | --- |
| 332,533 | Great Britain | July 16, 1930 |
| 489,610 | Great Britain | of 1937 |